United States Patent [19]

Pfarr, Jr.

[11] 4,180,247
[45] Dec. 25, 1979

[54] CHAIN LINK FABRIC ATTACHING SYSTEM

[75] Inventor: Walter L. Pfarr, Jr., Towson, Md.

[73] Assignee: Anchor Post Products, Inc., Baltimore, Md.

[21] Appl. No.: 798,749

[22] Filed: May 20, 1977

[51] Int. Cl.² .................... E044 17/02; B21F 27/00
[52] U.S. Cl. ........................ 256/54; 256/68; 24/213 B
[58] Field of Search ............ 256/54, 47, 24, 68, 256/73, DIG. 3, 32; 24/213 R, 213 B, 214, 255, 259; 52/501, 675, 714; 248/221.4; 403/397

[56] References Cited

U.S. PATENT DOCUMENTS

| | | | |
|---|---|---|---|
| 487,374 | 12/1892 | Parker | 256/54 |
| 1,593,099 | 7/1926 | Plants | 256/54 |
| 1,925,488 | 9/1933 | Kern | 256/54 |
| 2,104,239 | 1/1938 | Place | 24/213 B |
| 2,809,413 | 10/1957 | Wootton | 24/213 B |
| 2,817,131 | 12/1957 | Seegers | 24/213 B X |
| 3,001,755 | 9/1961 | Doyle | 248/221.4 X |
| 3,350,067 | 10/1967 | Coda | 256/54 X |
| 3,985,343 | 10/1976 | Sasena | 256/47 |

Primary Examiner—Ronald Feldbaum
Attorney, Agent, or Firm—Walter G. Finch

[57] ABSTRACT

The invention is an improved method and device for attaching chain link fabric to the framework of fences and other such enclosures. In particular, the invention provides a novel and unique method and device for holding chain link fabric to the outside face or surface of said framework. The framework (end post, line post, top rail, and/or bottom rail) is provided with a plurality of slots in the sides of the members of the framework, into which special clips or retainers mesh by press-fit and hold the chain link fabric in place. The said clips or retainers being capable of providing a tight connection to maintain the interface between the chain link fabric and the framework member to which attached once tension on the chain link fabric to keep it taut has been established. Several types of clips are provided that may be used. The system is useable on a variety of framework member cross-sectional designs.

3 Claims, 21 Drawing Figures

CHAIN LINK FABRIC ATTACHING SYSTEM

BACKGROUND AND SUMMARY OF THE INVENTION

The invention relates to the barrier covering used in any fenced enclosure, but is particularly related to barrier covering of the chain link type used for fences and other type enclosures.

A need has existed for an attachment method which can be used easily in the field for the assembly of fences or enclosures without the need for tediously wiring or otherwise laboriously attaching a barrier covering to the fence or enclosure framework. This invention answers that need.

In the past, fencing was assembled in the field by a time consuming procedure. This method required costly handling of the attaching means, which generally consisted of pieces of wire twisted around the framework members to hold the chain link fabric, or other barrier covering, flush against the outside surface or face of the framework members.

Other antiquated methods of attaching a barrier covering to a framework, such as by rivetting, bolting, pinning, and similar methods are within the scope and intent of the time-consuming methods that are eliminated by this invention.

Some of the current assembly methods require powered equipment for the assembling processes. This invention eliminates such expensive and laborious requirements.

The assembly in the field can be accomplished with hand tools. The slots are on the sides of the end posts, line posts, and top and bottom rails of the members of the framework. Clips for holding the chain link fabric or other barrier covering (which provides the barrier surface of the fence), are designed to fit easily into the slots in the framework members. The teeth-like ridges of the clips are easily pressed into place in the slots of the framework members, after being hooked to the chain link fabric or other similar barrier covering. The teeth-like ridges of the clips (which are sloped or canted in an opposing direction from which they enter the slot) catch or hold onto the sides of framework member on the interior, or opposite side, of the slot from which the clip entered the slot, and lock into place as said clips are pushed into place in said slots.

Several embodiments of the aforementioned clip will be described in the specifications which follow.

It should be noted that this invention is applicable to all configurations of framework members (rectangular or round tubular, flat bar or angle, and other such shapes) and any such framework member configuration is within the scope and intent of this invention.

It is therefore an object of the invention to provide an easy method of assembling a barrier covering for a fence or enclosure to a framework for said fence or enclosure.

It is another object of the invention to provide a simple device for attaching a barrier covering to a framework for a fence or enclosure for assembly in the field with simple hand tools.

It is still another object of the invention to provide a device for holding chain-link fabric or other barrier covering to a framework that can be pushed into assembled position Further objects and advantages of the invention will become more apparent in light of the following description of the preferred embodiments.

DESCRIPTION OF THE PREFERRED EMBODIMENTS OF THE INVENTION

Figure 1:
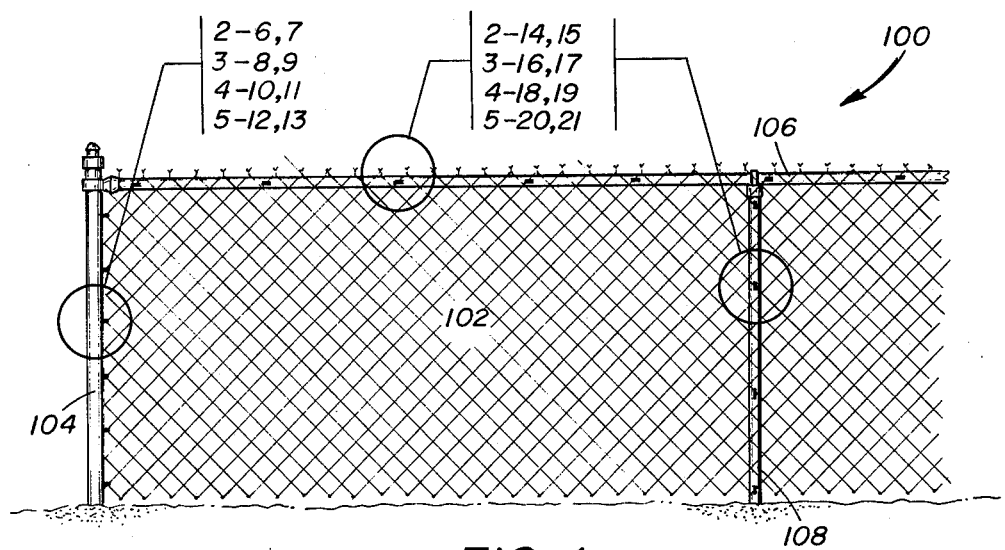
FIG. 1 is a typical fence, showing barrier covering on end and line posts and on a top rail, with indication of slots therein.

Referring now to FIG. 1 of the drawings, there is shown a typical fence assembly 100 of a typical chain link type fence. This typical fence assembly would normally extend longitudinally for any desired distance. Such a typical fence may also turn at right angles or any given angle at any selected location. Such turns normally occur at a typical end post 104, but may turn at a typical line post 108 when the angle of turn is slight.

The framework of the typical fence assembly 100, which can be formed of metal, or other suitable materials, consists of typical end posts 104, line posts 108, and a top rail 106. The framework is covered with a barrier covering 102 such as chain link fabric, or a similar material. A typical framework for a typical fence 100 may also include a bottom rail (not shown in drawings) similar to the typical top rail 106.

The inclusion of a bottom rail (not shown in drawings) is a typical fence 100 for use of this invention is within the scope and intent of the invention.

As shown in FIGS. 6, 7, 8, 9, 10, 11, 12, 13, 14, 16, 18, and 20, each frame member (hereinafter described) is formed, fabricated, or otherwise constructed with slots (hereinafter associated with the respective frame members in which they are located).

The drawings show the several embodiments of clips (110, 112, 114, and 116) in slots (134, 136, 138, and 140), these associations of clips and slots will be further described and associated with each other hereinafter.

The slots (134, 136, 138, and 140) shown in FIGS. 6, 7, 8, 9, 10, 11, 12, 13, 14, 16, 18 and 20 are all similar and may be standardized in size for comparable standardized sized clips (110, 112, 114, and 116), as far as the relative size of the male and female mating parts respectively of the clips (110, 112, 114, and 116) and the slots (134, 136, 138, and 140) are concerned.

The standardization hereinbefore mentioned does not preclude a non-standardization to accommodate one type of clip (110, 112, 114, or 116) of any random size from being mated with a matching sized slot (134, 136, 138, or 140), and is within the scope and intent of this invention.

Likewise, it should be noted that variations in the configuration of clips (110, 112, 114, or 116) or any comparable approach to a clip, and any variation in the configuration of the slots (134, 136, 138, or 140) which must accept a mating clip, are within the scope and intent of this invention.

Turning now to the previously described embodiments of this invention, the details of the structure are presented herewith.

Figure 2:
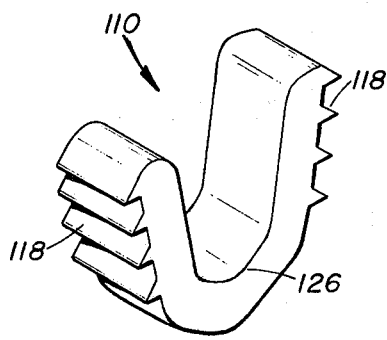
FIG. 2 is a first embodiment of a clip.
Figure 6:
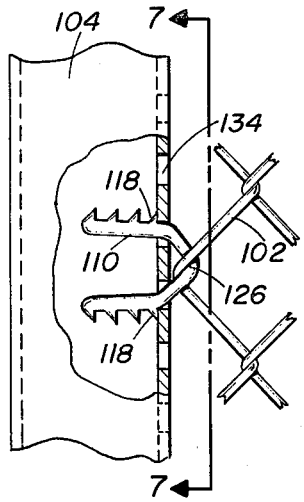
FIG. 6 is a partial sectional view of a typical end post, showing first embodiment of clip in use.

In FIG. 2 the configuration of the first embodiment of the clip 110 is shown. The clip 110 consists of a holding loop 126 that holds the fabric mesh 102 (in this case chain link fabric) at a point on one of the wire strands that make up the fabric mesh 102. The clip 110 has a plurality of gripping teeth 118 projecting outwardly on each side that hold the clip 112 in the slots 134 as shown in FIG. 6 for an end post 104, and in FIG. 14 for a line post 108, or a top rail 106. This clip 110 may be made of a plastics material or any material capable of enough flexibility to allow it to spring into place when pushed into the slot (134, 136, 138, or 140).

As described previously, the use here for a top rail 106 may also be used in a similar manner for a bottom rail (not shown in drawings), and such use hereinbefore and hereinafter with a bottom rail is intended whenever and wherever top rail is used and is within the scope and intent of this invention.

Figure 7:
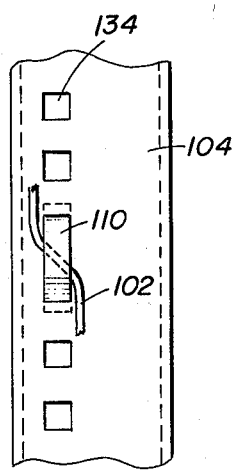
FIG. 7 is a view 7—7 of FIG. 6.

In FIG. 6 it can be seen how the holding loop 126 loops around a wire strand of the fabric mesh 102 and holds it in place as the clip 110 is pushed through slots 134 and the gripping teeth 118 due to their configuration catch and hold on the inside of the slots 134 in end post 104. In FIG. 7 another view shows how clip 110 loops over the strand of wire of fabric mesh 102 as the clip 110 is pushed through slots 134 in end post 104. The plurality of spaced gripping teeth 118 on clip 110 provides for space adjustment of the fabric mesh 102 in order to keep it taut when tension has been applied during erection of the typical fence structure 100.

Figure 14:
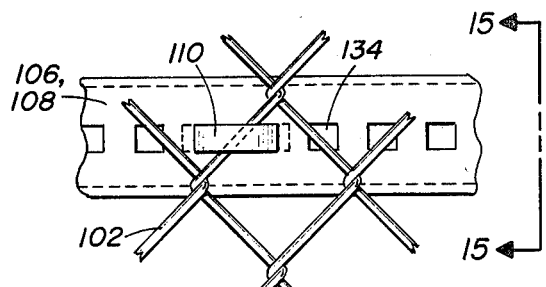
FIG. 14 is a partial sectional view of a typical top rail or line post, showing first embodiment of clip in use.
Figure 15:
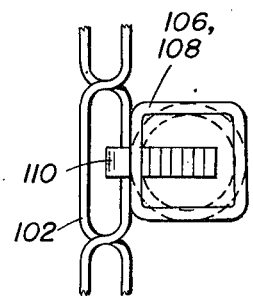
FIG. 15 is a view 15—15 of FIG. 14.
Figure 8:
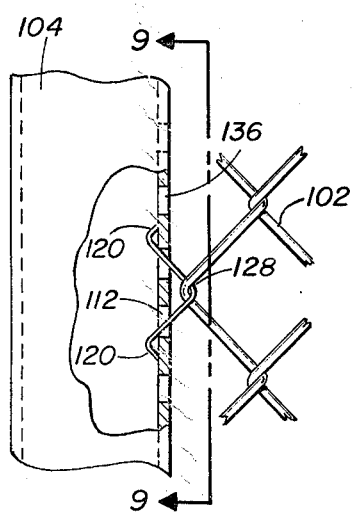
FIG. 8 is a partial sectional view of a typical end post, showing second embodiment of clip in use.
Figure 9:
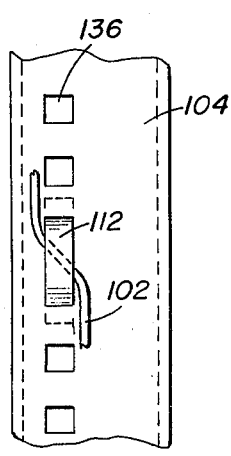
FIG. 9 is a view 9—9 of FIG. 8.
Figure 16:
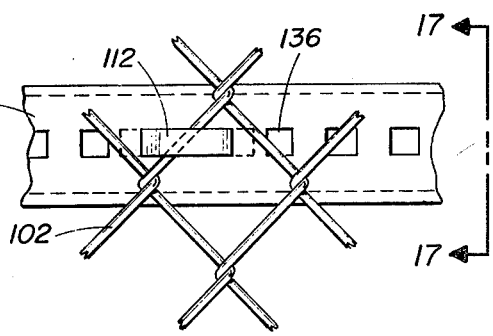
FIG. 16 is a partial sectional view of a typical top rail or line post, showing second embodiment of clip in use.
Figure 17:
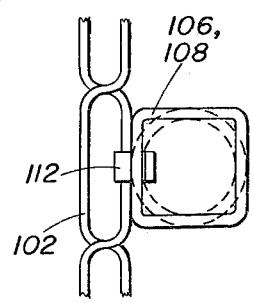
FIG. 17 is a view 17—17 of FIG. 16.

In a similar manner, the attaching of fabric mesh 102 to a line post 108 or a top rail 106 is shown in FIGS. 14 and 15. Note in FIG. 15 that both rectangular (in this case square) and round posts 108 and rails 106 are shown.

It should be noted that this invention is applicable to any configuration of end posts 104, line post 108 or top rails 106, and such variation in the configuration (geometrical or otherwise) is within the scope and intent of this invention.

It should also be noted that normally the attachment to end posts 104 is in a butt position with the edge of fabric mesh 102 abutting against a side of an end post 104. However, in the case of line posts 108 and top rails 106, the attachment is normally made against the face or outside surface of the line post 108 or top rail 106. This does not preclude a similar surface attachment to an end post 104 and such variations in positioning of the attachment is within the scope and intent of this invention.

As there are occasions when either a top rail 106 or a bottom rail (not shown) or both may be omitted from a specific fence structure 100, it does not preclude the application of this invention to the remaining fence structure of end posts 104 and line posts 108 and such variations of usage are within the scope and intent of this invention.

The slots (134, 136, 138, and 140) are formed, fabricated, punched, or otherwise manufactured in the end posts 104, line posts 108, and top rails 106 at spaced intervals along the lineal length of such parts of the typical fence structure 100. This spacing of a plurality of slots (134, 136, 138, and 140) makes it possible to select the necessary number of points along the height and length of the fabric mesh 102 to make the completed attachment of the fabric mesh 102 to the typical fence structure 100. With the plurality of spaced slots (134, 136, 138, and 140) sufficient matching points occur where wire strands of fabric mesh 102 meet the slots (134, 136, 138, and 140) for the insertion of the clips (110, 112, 114, and/or 116).

Having described the use of clip 110 in detail, the use of clips 112, 114, and 116 are similar. A brief description of these other embodiments of the clips (112, 114, and 116) will be made.

It should be noted that while certain materials for clips 110, 112, 114, and 116 are mentioned, the variation of materials (plastics or metals) for said clips 110, 112, 114, or 116 is within the scope and intent of this invention.

Figure 3:
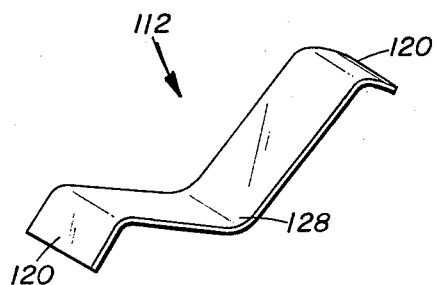
FIG. 3 is a second embodiment of a clip.

Turning now to FIG. 3, the second embodiment of a clip 112 is shown. This configuration may be formed from a strip or a wire with flexibility to spring into place when pushed into a slot (134, 136, 138, or 140). The material may be a stiffly flexible plastics or a metal. In a manner similar to previously described clip 110, clip 112 has a holding loop 128 and gripping teeth 120.

In a manner similar to previously described clip 110, clip 112 is shown in FIGS. 8, 9, 16, and 17, wherein clip 112 is shown in use on an end post 104 and on a line post 108 or top rail 106. The holding loop 128 is shown in relation to a wire strand of fabric mesh 102 and the gripping teeth 120 are shown in a holding relation to slots 136 through which clip 112 has been pushed.

Figure 4:
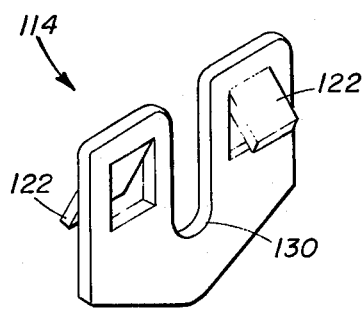
FIG. 4 is a third embodiment of a clip.

Turning now to FIG. 4, the third embodiment of a clip 114 is shown. The configuration is a flat plate of a stiffly flexible plastics or metal material with a holding loop 130 and a plurality of punched out gripping teeth 122 which spring enough to permit pushing the clip 114 into a slot (134, 136, 138, or 140) and then snap back to hold the clip in the said slot (134, 136, 138, or 140). The operation of the holding loop 130 and the gripping teeth 122 is similar in manner to the previously described clip 110.

Figure 18:
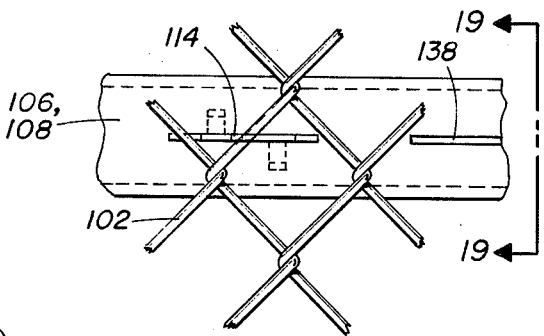
FIG. 18 is a partial sectional view of a typical top rail or line post, showing third embodiment of clip in use.
Figure 10:
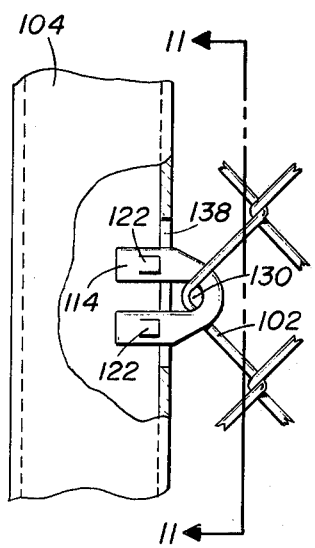
FIG. 10 is a partial sectional view of a typical end post, showing third embodiment of clip in use.
Figure 11:
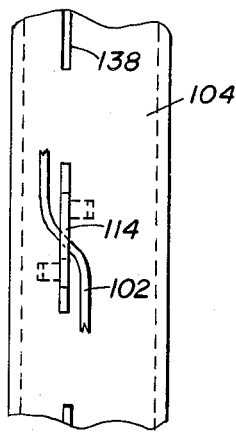
FIG. 11 is a view 11—11 of FIG. 10.
Figure 19:
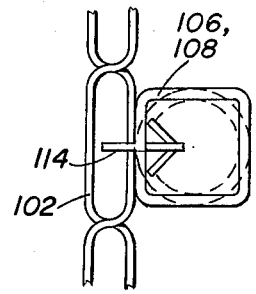
FIG. 19 is a view 19—19 of FIG. 18.

Likewise, in a manner similar to the previously described clip 110, clip 114 is shown in FIGS. 10 and 11 for an end post 104, and in FIGS. 18 and 19 for a line post 108 and a top rail 106. The holding loop 130 is shown in relation to a wire strand of fabric mesh 102 and the gripping teeth 122 are shown in a holding relation to slots 138 through which clip 114 has been pushed.

Note that a narrow slot 138 is shown in relation to the width or thickness of clip 114. This, however, is one of the variations of the slots (134, 136, 138, or 140) that may be used if designed so that the intended clip (134, 136, 138, or 140) may be inserted by pushing it through into place. The use of a standarized slot (134, 136, 138, and 140) to fit any clip (110, 112, 114, and 116) has been described hereinbefore.

Figure 5:
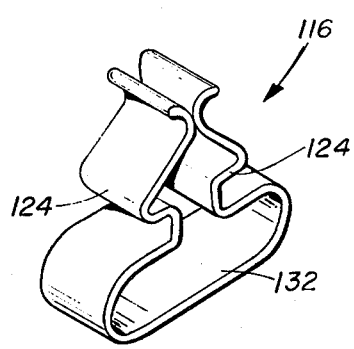
FIG. 5 is a fourth embodiment of a clip.

Turning now to FIG. 5, the fourth embodiment of a clip 116 is shown. The configuration may be formed from a strip or a wire with flexibility to spring into place when pushed into a slot (134, 136, 138, or 140). The material may be a stiffly flexible plastics or a metal. In a manner similar to previously described clip 110, clip 116 has a holding loop 132, and gripping teeth or projections 124.

Figure 20:
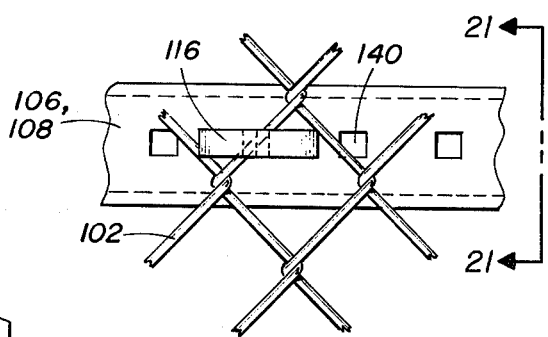
FIG. 20 is a partial sectional view of a typical top rail or line post, showing fourth embodiment of clip in use.
Figure 12:
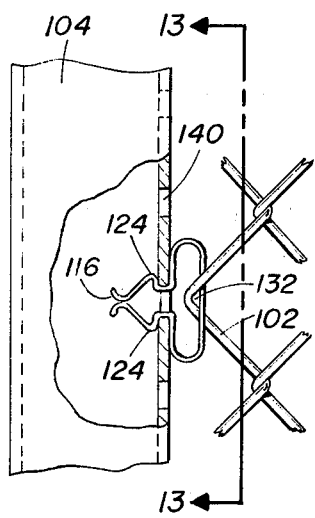
FIG. 12 is a partial sectional view of a typical end post, showing fourth embodiment of clip in use.
Figure 13:
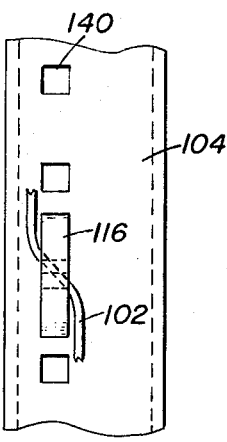
FIG. 13 is a view 13—13 of FIG. 12.
Figure 21:
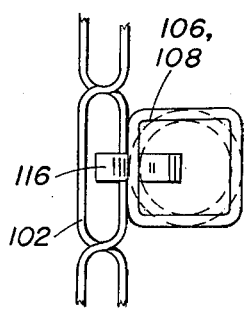
FIG. 21 is a view 21—21 of FIG. 20.

In a manner similar to previously described clip 110, clip 116 is shown in use in FIGS. 12 and 13 on an end post 104 and in FIGS. 20 and 21 on a line post 108 or a top rail 106. The holding loop 132 is shown in relation to a wire strand of fabric mesh 102 and the gripping teeth or projections 124 are shown in a holding relation to slots 140 through which clip 116 has been pushed.

In FIG. 1 the other FIGS. 2, 3, 4, and 5 for clips 110, 112, 114, and 116 are tabulated and related to typical locations for each said clips in end post 104, line post 108, and top rail 106. Also tabulated in relation to the tabulated FIGS. 2, 3, 4, and 5 are the related FIGS. 6 through 21 showing applications of clips 110, 112, 114, and 116.

In operation, the desired clips 110, 112, 114, or 116 are used to assemble the fabric mesh 102 (in this case chain link fabric) in taut condition to a typical fence structure 100 consisting of typical end posts 104, line posts 108, and top rails 106 (as noted previously), bottom rails similar to top rails 106 may also be used, but are not shown in the drawing.

Although this invention has been described for chain link fabric as part of a typical fence structure, it is equally usable for any type of fabric used in a typical fence structure that must be held to a framework.

As can be readily understood from the aforegoing description of the invention, the present structure can be configured in different modes to provide the ability for various arrangements of the clips or slots or the attachment of the fabric mesh. Such configuring in different modes that utilized the novel and unique concepts of this invention are within the scope and intent of this invention.

Accordingly, modifications and variations which the invention is susceptible to may be practiced without departing from the scope of the appended claims.

What is claimed is:

1. A holding system for attaching chain link fabric to a framework structure, comprising:
    a plurality of flexible formed clips, each said clip consisting of two arms with a portion of each arm being parallel to one another and permanently linked together at the adjacent end by a continuation of one arm to become the other opposite arm, said arms continuing from the point where permanently linked to each other to their respective distal ends, a protrusion is extending from one surface of each of said two arms, said flexible formed clips attaching said chain link fabric to said framework structure by looping each said flexible formed clip over a wire member of said chain link fabric and inserting said two arms of said flexible formed clip into one or more apertures in said frame work structure and so that said protrusions lock on opposite sides of said aperture, said two arms being formed from a relatively thin flat plate and so arranged as to provide an open central slot between them, said flat plate having a plurality of rectangular apertures therein on opposite sides of said open central slot so that a portion of said apertures is in one of said two arms, and the other apertures are in the other of said two arms, and wherein displaced material of said rectangular aperture is disconnected from said flat plate on three sides only and is bent outwardly forming said protrusion at a slight angle from the side of said rectangular aperture from which displaced material is not disconnected, the side of said aperture not disconnected being the side adjacent to and parallel with the distal end of said arms, said bent protrusions being deformed so that a portion of said protrusions extend from both sides of said flat plate, a portion of said protrusions being in each of said two arms.

2. The holding system recited in claim 1 wherein said flexible formed clips are made of plastics.

3. The holding system recited in claim 1 wherein said flexible formed clips are made of metal.

* * * * *